(12) United States Patent
Wiggins

(10) Patent No.: US 7,014,035 B2
(45) Date of Patent: Mar. 21, 2006

(54) SYSTEM FOR SUPPORTING AN UNDERSIDE ROLLER ON A CONVEYING BELT

(75) Inventor: Daniel Wiggins, Marquette, MI (US)

(73) Assignee: Argonics, Inc., Marquette, MI (US)

( * ) Notice: Subject to any disclaimer, the term of this patent is extended or adjusted under 35 U.S.C. 154(b) by 0 days.

(21) Appl. No.: 10/736,873

(22) Filed: Dec. 16, 2003

(65) Prior Publication Data

US 2005/0126888 A1    Jun. 16, 2005

(51) Int. Cl.
*B65G 45/00*      (2006.01)

(52) U.S. Cl. .................................. 198/497; 198/842

(58) Field of Classification Search ............. 198/860.3, 198/497, 493, 494, 842, 735.1, 498, 499
See application file for complete search history.

(56) References Cited

U.S. PATENT DOCUMENTS

| | | | | |
|---|---|---|---|---|
| 789,628 | A * | 5/1905 | Rhodes ........................ | 198/497 |
| 897,955 | A * | 9/1908 | Barrett et al. ................ | 198/497 |
| 1,275,808 | A * | 8/1918 | Wentz .......................... | 198/497 |
| 1,375,173 | A * | 4/1921 | Plaisted ....................... | 474/166 |
| 1,580,638 | A * | 4/1926 | Benbow ...................... | 198/497 |
| 1,779,686 | A * | 10/1930 | Alver .......................... | 198/497 |
| 2,417,477 | A * | 3/1947 | Finney, Jr. ................... | 209/428 |
| 3,035,683 | A * | 5/1962 | Bishop ........................ | 198/790 |
| 3,319,779 | A | 5/1967 | Herrmann | |
| 3,743,078 | A * | 7/1973 | Pittoreau .................. | 198/860.3 |
| 3,944,050 | A * | 3/1976 | Kane ........................... | 198/497 |
| 5,226,703 | A | 7/1993 | Norman | |
| 5,341,920 | A | 8/1994 | Riffe | |
| 5,341,921 | A | 8/1994 | Kokolis | |
| 5,355,992 | A * | 10/1994 | Baig et al. .................. | 198/495 |
| 5,725,292 | A | 3/1998 | Keedy et al. | |
| 6,318,545 | B1 * | 11/2001 | Ross, II .................... | 198/860.3 |

FOREIGN PATENT DOCUMENTS

| | | |
|---|---|---|
| DE | 39 40 786 C1 | 5/1991 |
| FR | 2782990 | 3/2000 |

\* cited by examiner

*Primary Examiner*—Richard Ridley
(74) *Attorney, Agent, or Firm*—Wood, Phillips, Katz, Clark & Mortimer

(57) ABSTRACT

A conveyor system having a conveying belt trained around guide rollers for movement in a travel path, a first roller which is mounted in an operative position on a support to bear against the conveying belt, and a roller support system. The roller support system has at least one wall which confines downward movement of the first roller in the event that the first roller becomes disengaged from its operative position. The roller support system defines at least one opening through which foreign matter separated from the first roller can pass.

35 Claims, 3 Drawing Sheets

SYSTEM FOR SUPPORTING AN UNDERSIDE ROLLER ON A CONVEYING BELT

BACKGROUND OF THE INVENTION

1. Field of the Invention

This invention relates to conveyor systems of the type having a conveying belt trained around spaced rollers for movement in a predetermined travel path. More particularly, the invention is directed to a support system for underside rollers which bear against the moving conveying belt.

2. Background Art

Conveyor systems are used in a wide range of applications in many diverse environments. In a typical conveyor system, a conveying belt is trained around spaced head and tail pulleys for continuous movement in a predetermined travel path. In a portion of the travel path, the conveying belt defines an upwardly facing supporting surface upon which material can be placed to transport the same from one location to another as dictated by the system configuration. A significant expanse may exist between the head and tail pulleys. The unsupported belt traveling in the underside path portion is commonly supported by one, or a plurality of, rollers, commonly designated "idler rollers".

Often conveyor systems are constructed so that there is sufficient space beneath the conveying belt for individuals to pass. This presents two potentially dangerous situations. First of all, the conveying belt moving in the underside path portion at each idler pulley creates a potentially dangerous pinch point. Inadvertent contact by anyone with the conveying belt at the underside path portion upstream of an idler pulley could draw a contacting limb dangerously into the pinch point. The converging structural shape defined by the conveying belt at each idler roller is aggravated by the fact that both the conveying belt and idler roller are moving in a direction that tends to draw objects to the pinch point. The industry has long been aware of the above problem. A number of guards have been designed to reduce the risk of injury at the idler roller location. One such guard system blocks the converging geometry upstream of the pinch point.

While a guard of this type addresses potential injury, it also introduces another operating problem. The guard system defines an obstruction which intercepts material that has not been cleaned from the conveying belt as it passes through its underside path portion. This condition may eventually lead to the impairment of the system operation. Often, the conveyed material may be a particulate that has a tendency to bind. This condition may be aggravated by severe conditions in which the conveyor system operates which dampen the conveyed material and may increase the tenacity of the bond to the conveying belt. This type of material may follow the belt into its return path portion whereby it progressively accumulates at the guard location to the point that conveying belt movement and/or idler roller operation may be impaired. This accumulation of material may also be sufficient that the idler roller may be forced to separate from its mounting.

Conventional idler rollers have had a tendency to separate from their mounts in conveyor systems. These rollers have a significant weight that could inflict injury upon anyone who is contacted by them. There is an increasing awareness of this problem. This has lead to the development of certain guards which are designed to prevent potentially dangerous, unrestricted downward travel of idler rollers that have separated from their supports. One example of such a guard is shown in U.S. Pat. No. 6,318,545 (Ross, II). Ross II has a trough-shaped element placed over each idler roller. In the event of separation, the idler roller will be "caught" and confined by the trough-shaped element.

Ross II also discloses structure for wiping the underside of the blade on both the upstream and downstream ends of the guard. This avoids the migration of foreign matter carried on the conveying belt into the chamber defined by the trough-shaped element. However, it is inevitable that there will be some material that does find its way past the upstream wiper and into the roller receptacle bounded by the trough-shaped element. This progressive accumulation could ultimately fill the receptacle which could block the movement of the idler roller and also potentially accumulate a mass sufficient to disengage the entire roller mechanism, including the guard, from its support.

There is currently underway a campaign from governing bodies in this industry to require guards to prevent personal injury in the vicinity of the idler rollers resulting from the above situations. Designers in this industry continue to seek ways to address safety issues without impairing the basic operation of the conveyor systems.

SUMMARY OF THE INVENTION

One form of the invention is directed to a conveyor system having a conveying belt trained around guide rollers for movement in a travel path, a first roller which is mounted in an operative position on a support to bear against the conveying belt, and a roller support system. The roller support system has at least one wall which confines downward movement of the first roller in the event that the first roller becomes disengaged from its operative position. The roller support system defines at least one opening through which foreign matter separated from the first roller can pass.

In one form, the roller support system defines an upwardly opening, trough-shaped receptacle for the first roller.

In one form, the roller support system bears against the conveying belt.

In one form, the trough-shaped receptacle has a top and bottom and the at least one opening is defined toward the bottom of the receptacle so that the at least one wall guides foreign matter separated from the first roller downwardly toward the at least one opening.

In one form, the first roller has a first axis and the roller support system has a first blade that is movable around a second axis that is substantially parallel to the first axis.

The roller support system may include a second blade that is movable independently of the first blade around a third axis that is substantially parallel to the first axis.

In one form, the first blade has a first free end, the second blade has a first free end, and the at least one opening is defined between the first free ends of the first and second blades.

In one form, the first blade has a first free end that bears against the first roller. The first blade has a second free end that bears against the conveying belt.

The first blade may have a concave surface opening toward the first axis.

In one form, the second axis resides between the first and second free ends of the first blade.

In one form, the blade has a thickness that diminishes from the second axis towards the first free end of the first blade. The first blade may have a thickness that diminishes from the second axis toward the second free end of the first blade.

In one form, the travel path includes an underside path portion and the first roller bears against the conveying belt at the underside path portion.

The travel path includes a conveying path portion. In one form, the first roller bears against the conveying belt at the conveying path portion.

The roller support system may include first and second independent blades.

In one form, the at least one wall is defined by the first and second blades and the first and second blades cooperatively define a trough-shaped receptacle for the first roller.

The at least one opening may be defined between the first and second blades.

The at least one wall may be made from a urethane material.

The invention is further directed to a conveyor system having a conveying belt trained around guide rollers for movement in a travel path, a first roller which is mounted in an operative position on a support to bear against the conveying belt, and a first blade that bears against the first roller and the conveying belt to strip foreign matter from the first roller and conveying belt.

In one form, the first roller has a first axis and the first blade is movable around a second axis that is substantially parallel to the first axis.

In one form, the first blade has a first free end that bears against the first roller and a second free end that bears against the conveying belt, with the second axis residing between the first and second free ends.

The first blade has a thickness. In one form, the thickness diminishes from the second axis toward the first free end of the first blade. The thickness may diminish from the second axis towards the second free end of the first blade.

In one form, the first blade has a concave surface opening toward the first roller axis.

The first blade may be made from a urethane material.

The invention is further directed to a cleaning blade for bearing simultaneously against a roller and a conveying belt which is moving in a travel path to strip foreign matter therefrom. The cleaning blade has a body with a mounting portion which is attachable to a support, a first portion projecting in a first direction away from the mounting portion, and a second portion projecting away from the mounting portion generally oppositely to the first direction. The first portion defines a first free end to engage a roller. The second portion defines a second free end to engage a conveying belt.

The mounting portion may have an axis about which the cleaning blade can be pivotably mounted.

The cleaning blade has a thickness which in one form diminishes from the mounting portion toward the first free end of the cleaning blade. The thickness may diminish from the mounting portion toward the second free end of the cleaning blade.

In one form, the cleaning blade has a concave surface.

The cleaning blade may be made from a urethane material.

DETAILED DESCRIPTION OF THE DRAWINGS

Figure 1:
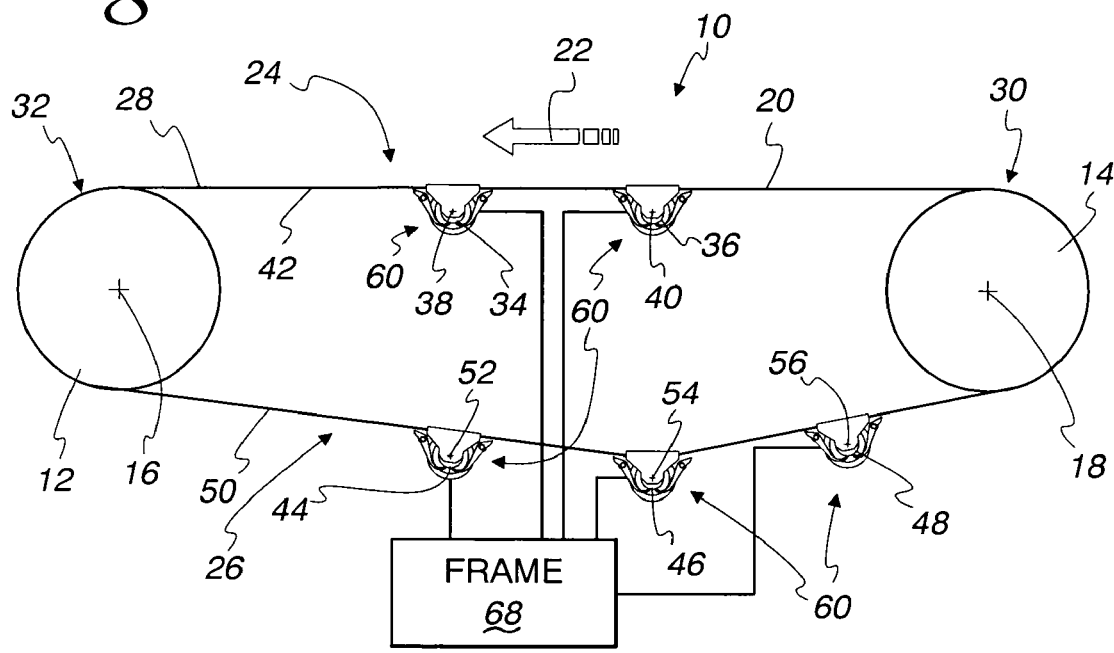
FIG. 1 is a partially schematic, side elevation view of a conveyor system consisting of a conveying belt and idler rollers acting thereagainst and incorporating roller support systems, according to the invention.

In FIG. 1, a conveyor system, incorporating the present invention, is shown at 10. The conveyor system 10 consists of a head roller 12 and a tail roller 14 arranged in spaced relationship so as to be rotatable about parallel axes 16, 18, respectively. A conveying belt 20 is trained around the head and tail rollers 12, 14 for movement in a continuous, predetermined travel path, in the direction of the arrow 22. The travel path for the conveying belt 20 includes a conveying path portion 24 and an underlying, return path portion 26. In the conveying path portion 24, the conveying belt 20 has an upwardly facing surface 28 which supports objects or particulate material, or the like, which is transported by the conveying belt 20 between spaced locations. The conveying range is dictated by the length of the conveying path portion between upstream and downstream conveying locations, identified at 30 and 32, respectively. The conveying belt 20 returns in the underlying path portion 26.

To support the conveying belt 20 in the conveying path portion 24 between the head and tail rollers 12, 14, one or more support/idler rollers 34, 36 are mounted for pivoting movement about axes 38, 40, respectively, which axes 38, 40 are generally parallel to the head and tail roller axes 16, 18. The support/idler rollers 34, 36 bear on the otherwise unsupported underside 42 of the conveying belt 20 between the head and tail rollers 12, 14. The support/idler rollers 34, 36 limit the extent of belt sag between the head and tail rollers 12, 14 and also support the conveying belt 20 under impact forces applied, as through loading.

Similar support/idler rollers 44, 46, 48 are mounted to bear on the downwardly facing surface 50 of the conveying belt 20 in the underlying return path portion 26 between the head and tail rollers 12, 14. The support/idler rollers 44, 46, 48 are movable about axes 52, 54 56, respectively, which are substantially parallel to each other and to the head and tail roller axes 16, 18. The function of the support/idler rollers 44, 46, 48 is the same as for the support/idler rollers 34, 36. However, the support/idler rollers 44, 46, 48 are not subjected to loading forces at their respective locations, other than that imparted by the weight of the conveying belt 20 and any material adhered thereto.

Figure 2:
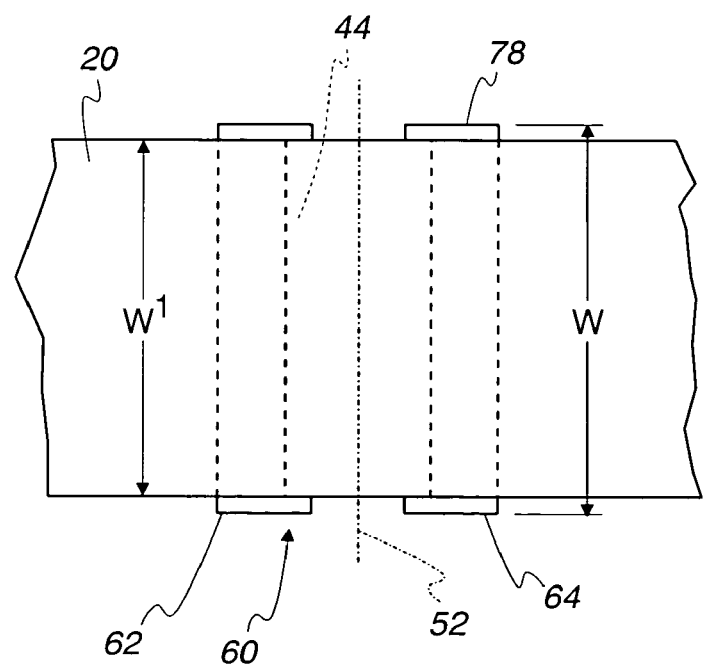
FIG. 2 is a plan view of a portion of the cleaning belt of FIG. 1 with an idler roller acting thereagainst and with the inventive roller support system incorporated so as to clean both the roller and conveying belt.

Each support/idler roller 34, 36, 44, 46, 48 has an associated roller support system 60. The roller support system 60 is the same for each of the associated support/idler rollers 34, 36, 44, 46, 48. However, a roller support system 60 need not be incorporated at each location where a support/idler roller is provided. The details of the roller support system 60 will be described with respect to FIGS. 2–4, taken in conjunction with FIG. 1.

The roller support system 60 consists of first and second blades 62, 64, in this case each having the same configuration. The blades 62, 64 cooperate in pairs with each of the support/idler pulleys 34, 36, 44, 46, 48. The performance of one cooperating pair of blades 62, 64 will be described with respect to exemplary support/idler roller 44.

The support/idler roller 44 is journalled for rotation relative to a frame 68 for guided movement around its axis 52. The frame 68 may be independently supported, or maintained in its operative position, in conjunction with other conveyor system components, on a common support. A mounting bolt 70 passes through spaced flanges 72 (one shown) on the frame 68 and the idler roller 44 therebetween. The flanges 72 are joined by a base 73 and define a space 74 through which the conveying belt 20 travels in the direction shown by the arrow 76.

Exemplary blade 64 has a body 78 with a width W that is slightly greater than the width W1 of the conveying belt 20. The body 78 has an enlarged mounting portion 80 through which a mounting pin 82 extends. The mounting pin 82 supports the blade 64 on the frame 68 for pivoting movement around an axis 86, that is generally parallel to the axis 52 of the support/idler roller 44.

The blade body 78 has a first portion 88 which projects in a first direction away from the mounting portion 80 and a second portion 90 which projects generally oppositely from the direction of projection of the mounting portion 80. The axis 86 resides between the first and second blade portions 88, 90.

The first blade portion 88 is curved so as to define a concave surface 92 opening towards the support/idler roller axis 52. The first portion 88 tapers in thickness T from the mounting portion 80 towards a free end 94. The second blade portion 90 diminishes in thickness from the mounting portion 80 towards an opposite free end 96. The blade 64 is designed so that the free end 94 abuts to the support/idler roller 44 simultaneously as the opposite free end 96 abuts to the underside 50 of the conveying belt 20 in the underlying return path portion 26.

The blade 64 can be configured so that the free end 94 is biasably urged against the support/idler roller 44 simultaneously as the opposite free end 96 is biasably urged against the conveying belt 20. Accordingly, as the support/idler roller 44 moves in the direction of the arrow 98 around the axis 52, the free end 94 of the first blade portion 88 strips foreign matter attached to the support/idler roller 44 at the same time as the opposite free end 96 strips foreign material adhered to the underside 50 of the conveying belt 20.

With the first and second blades 62, 64 assembled, the first blade 62 is a mirror image of the second blade 64. Parts on the blade 62, corresponding to those on the blade 64, will be identified using the same numbers as for the blade 64, with the addition of a "'". The free ends 94', 96' on the blade 62 bear against the support/idler roller 44 and underside 50 of the conveying blade 20 to provide redundant cleaning of both elements.

Additionally, the blade surfaces 92, 92' cooperatively define a trough-shaped receptacle 100 for the support/idler roller 44. An opening 104 is provided between the free ends 94, 94' of the blades 64, 62 through which foreign matter separated from the support/idler roller 44 can pass out of the receptacle 100 for discharge. At the same time, in addition to performing a cleaning function, the blades 62, 64 confine downward movement of the support/idler roller 44 if, for example, the support/idler roller 44 becomes disengaged from its operative position by reason of separation of the support/idler roller 44 from the frame 68 or separation of part of the frame 68 from its supporting structure. The width of the opening 104 is significantly less than the diameter of the support/idler roller 44 to achieve this end.

The dimensions and composition of the blades 62, 64 are chosen so that the blades 62, 64 will perform the desired scraping function on both the support/idler roller 44 and the underside 50 of the conveying blade 20, while at the same time providing enough rigidity to support the support/idler roller 44 in the event of separation thereof from its operative position. Urethane material has proven to be a desirable material for the blades 62, 64.

Additionally, the configuration of the first blade portion 88 is such that the blade portions 88, 88' can be flexed to operatively engage support/idler rollers 44', 44", 44''', having different diameters as shown in dotted lines.

The invention contemplates that while the blades 60, 62, 64 have the same configuration, they may also have different configurations. As just one example, as shown in FIG. 3, the blade portion 90' can be truncated along the dotted line 106 so that the blade 62 does not engage the conveying belt 20 to effect cleaning thereof.

Figure 3:
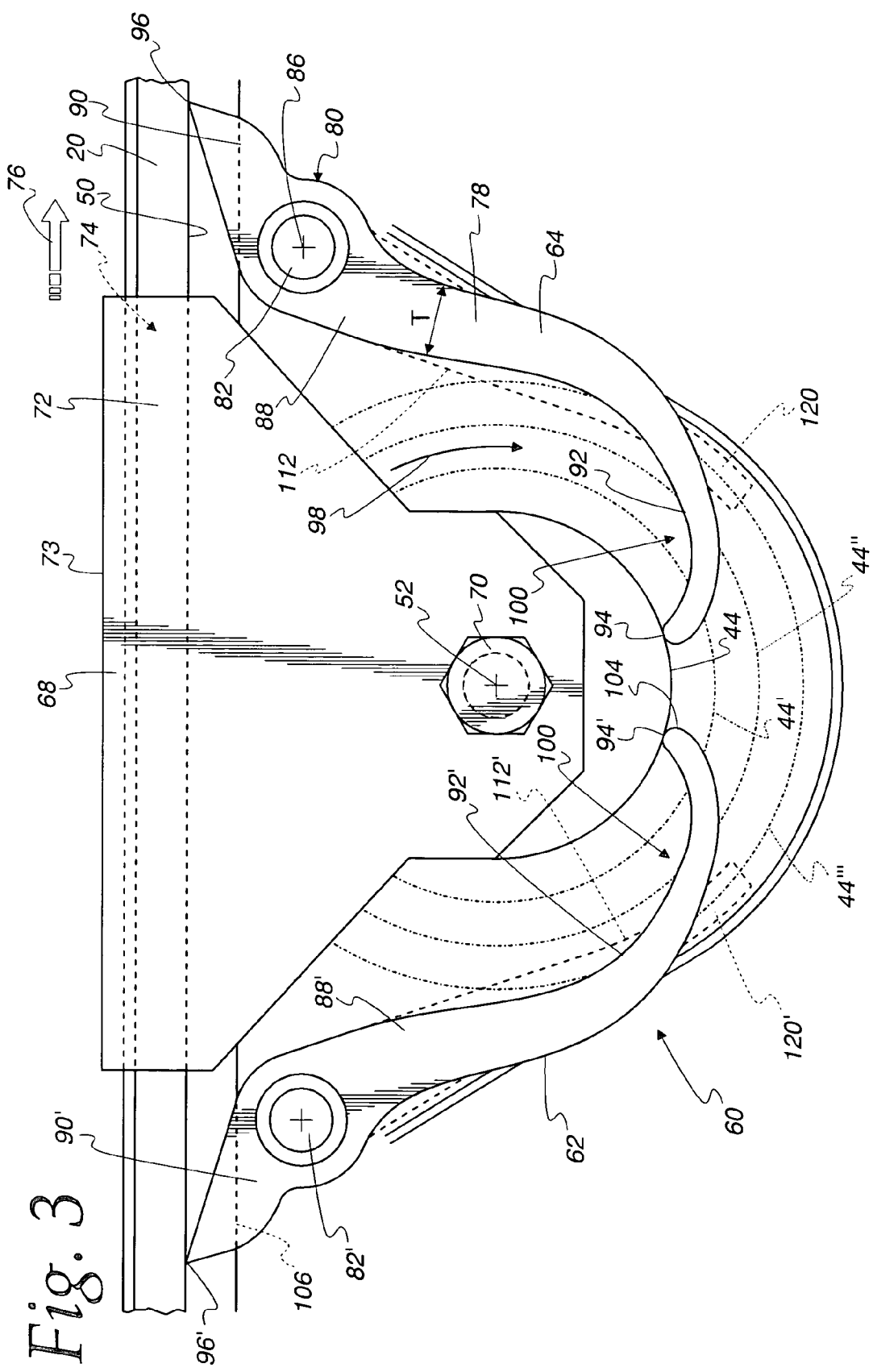
FIG. 3 is an enlarged, side elevation view of the elements in FIG. 2.
Figure 4:
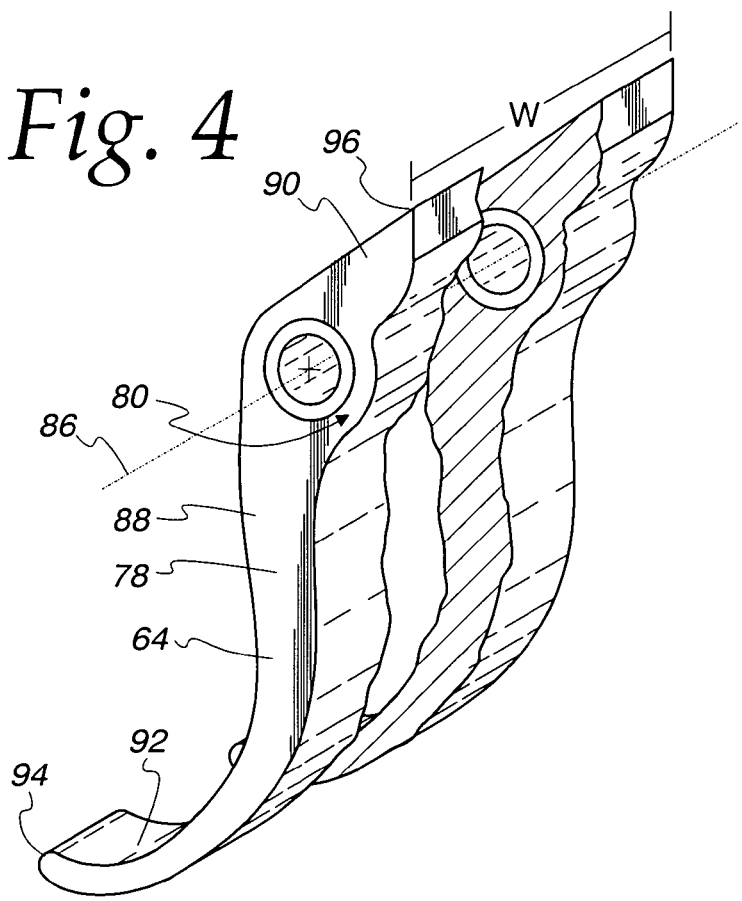
FIG. 4 is an enlarged, perspective view of one form of blade, according to the invention, that is part of the roller support system, and which bears against a roller and conveying belt to effect cleaning thereof.
Figure 5:
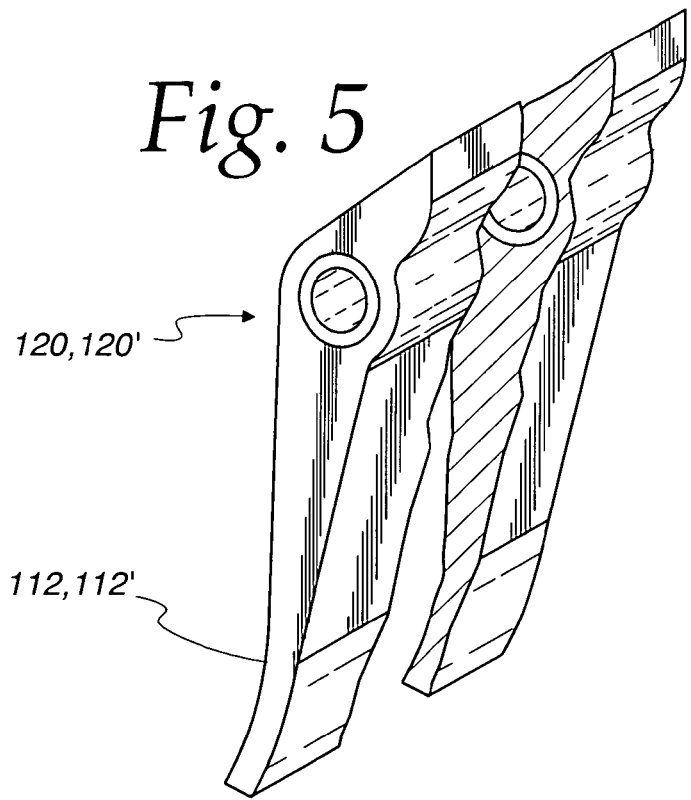
FIG. 5 is an enlarged, perspective view of a modified form of blade, according to the present invention.

An alternative form of blade is shown at 120, 120' in solid lines in FIG. 5 and in dotted lines in FIG. 3. The blade 120 has a similar construction to the blade 62, with the exception that the concave surface 112, 112', corresponding to the surface 92, 92', has a larger radius of curvature. A smaller radius of curvature allows the free ends 94, 94' to be brought into contact with support/idler rollers of different diameter with the same general orientation, i.e. angle of attack.

The foregoing disclosure of specific embodiments is intended to be illustrative of the broad concepts comprehended by the invention.

What is claimed is:

1. A conveyor system comprising:
   a conveying belt trained around guide rollers for movement in a travel path;
   a first roller which is mounted in an operative position on a support to bear against the conveying belt and having a rotational axis; and
   a roller support system comprising at least one wall with an axial extent parallel to the rotational axis and which confines downward movement of the first roller in the event that the first roller becomes disengaged from the operative position,
   the roller support system defining at least one elongate opening with a length extending substantially parallel to the rotational axis of the first roller through which foreign matter separated from the first roller can pass,
   the one opening having a width transverse to the length of the one opening that is substantially uniform and continuous over a substantial portion of the axial extent of the one wall.

2. The conveyor system according to claim 1 wherein the roller support system defines an upwardly opening trough-shaped receptacle for the first roller.

3. The conveyor system according to claim 2 wherein the trough-shaped receptacle has a top and bottom and the one opening is defined toward the bottom of the receptacle so that the at least one wall guides foreign matter separated from the first roller downwardly towards the at least one opening, the one wall having a solid construction without openings therethrough along at least a portion thereof extending fully from the top of the trough-shaped receptacle up to the one opening.

4. conveyor system comprising:
   a conveying belt trained around guide rollers for movement in a travel path;
   a first roller which is mounted in an operative position on a support to bear against the conveying belt; and a roller support system comprising at least one wall which confines downward movement of the first roller in the event that the first roller becomes disengaged from the operative position, the roller support system defining at least one opening through which foreign matter separated from the first roller can pass, wherein the first roller has a first axis about which the first roller rotates and the roller support system comprises a first blade that is movable around a second axis that is substantially parallel to the first axis.

5. The conveyor system according to claim 4 wherein the roller support system comprises a second blade that is movable independently of the first blade around a third axis that is substantially parallel to the first axis.

6. The conveyor system according to claim 5 wherein the first blade has a first free end, the second blade has a first free end, and the at least one opening is defined between the first free ends of the first and second blades.

7. A conveyor system comprising:
a conveying belt trained around guide rollers for movement in a travel path;
a first roller which is mounted in an operative position on a support to bear against the conveying belt; and
a roller support system comprising at least one wall which confines downward movement of the first roller in the event that the first roller becomes disengaged from the operative position,
the roller support system defining at least one opening through which foreign matter separated from the first roller can pass,
wherein the roller support system comprises a first blade and the first blade has a first free end that bears against the first roller.

8. The conveyor system according to claim 7 wherein the first blade has a second free end that bears against the conveying belt.

9. The conveyor system according to claim 8 wherein the first roller has a first axis and the first blade is pivotable around a second axis that is parallel to the first axis.

10. The conveyor system according to claim 9 wherein the first blade has a concave surface opening toward the first axis.

11. The conveyor system according to claim 9 wherein the second axis resides between the first and second free ends of the first blade.

12. The conveyor system according to claim 9 wherein the first blade has a thickness that diminishes from the second axis toward the first free end of the first blade.

13. The conveyor system according to claim 8 wherein the first roller has a first axis, the first blade is movable around a second axis that is parallel to the first axis, and the first blade has a thickness that diminishes from the second axis toward the second free end of the first blade.

14. The conveyor system according to claim 1 wherein the travel path includes an underside path portion and the first roller bears against the conveying belt at the underside path portion.

15. The conveyor system according to claim 1 wherein the travel path includes a conveying path portion and the first roller bears against the conveying path portion.

16. The conveyor system according to claim 1 wherein the roller support system comprises first and second independent blades.

17. A conveyor system comprising:
a conveying belt trained around guide rollers for movement in a travel path;
a first roller which is mounted in an operative position on a support to bear against the conveying belt; and
a roller support system comprising at least one wall which confines downward movement of the first roller in the event that the first roller becomes disengaged from the operative position,
the roller support system defining at least one opening through which foreign matter separated from the first roller can pass,
wherein the roller support system comprises first and second independent blades,
wherein the at least one wall is defined by the first and second blades and the first and second blades cooperatively define a trough-shaped receptacle for the first roller.

18. The conveyor system according to claim 17 wherein the at least one opening is defined between the first and second blades.

19. The conveyor system according to claim 1 wherein the roller support system bears against the conveying belt.

20. The conveyor system according to claim 1 wherein the at least one wall comprises a urethane material.

21. A conveyor system comprising:
a conveying belt trained around guide rollers for movement in a travel path and having oppositely facing first and second surfaces, with the first surface supporting objects/materials to be conveyed by the conveyor system;
a first roller which is mounted in an operative position on a support to bear against the conveying belt; and
a first blade comprising a single piece that bears against the first roller and the first surface on the conveying belt to strip foreign matter from the first roller and conveying belt.

22. A conveyor system comprising:
a conveying belt trained around guide rollers for movement in a travel path;
a first roller which is mounted in an operative position on a support to bear against the conveying belt; and
a first blade that bears against the first roller and the conveying belt to strip foreign matter from the first roller and conveying belt,
wherein the first roller has a first axis and the first blade is movable around a second axis that is substantially parallel to the first axis.

23. The conveyor system according to claim 22 wherein the first blade has a first free end that bears against the first roller and a second free end that bears against the conveying belt and the second axis resides between the first and second free ends.

24. The conveyor system according to claim 23 wherein the first blade has a thickness that diminishes from the second axis towards the first free end of the first blade.

25. The conveyor system according to claim 24 wherein the first blade has a thickness that diminishes from the second axis toward the second free end of the first blade.

26. A conveyor system comprising:
a conveying belt trained around guide rollers for movement in a travel path;
a first roller which is mounted in an operative position on a support to bear against the conveying belt; and
a first blade that bears against the first roller and the conveying belt to strip foreign matter from the first roller and conveying belt,
wherein the first roller has a first axis and the first blade has a concave surface opening toward the first axis.

27. The conveyor system according to claim 21 wherein the first blade comprises a urethane material.

28. A cleaning blade for bearing simultaneously against a roller and a conveying surface on a conveying belt against which matter bears to be conveyed by the conveying belt as the conveying belt is moving in a travel path, to strip foreign matter therefrom, the cleaning blade comprising:
  a body having a mounting portion which is attachable to a support, a first portion projecting in a first direction away from the mounting portion, and a second portion projecting away from the mounting portion generally oppositely to the first direction,
  the first portion defining a first free end to engage a roller,
  the second portion defining a second free end to engage the conveying surface of a conveying belt,
  the first portion and second portion defined by a single piece.

29. A cleaning blade for bearing simultaneously against a roller and a conveying surface on a conveying belt which is moving in a travel path to strip foreign matter therefrom, the cleaning blade comprising:
  a body having a mounting portion which is attachable to a support, a first portion projecting in a first direction away from the mounting portion, and a second portion projecting away from the mounting portion generally oppositely to the first direction,
  the first portion defining a first free end to engage a roller,
  the second portion defining a second free end to engage the conveying surface on a conveying belt,
  wherein the mounting portion has an axis about which the cleaning blade can be pivotably mounted.

30. The cleaning blade according to claim 28 wherein the cleaning blade has a thickness that diminishes from the mounting portion toward the first free end of the cleaning blade.

31. A cleaning blade for bearing simultaneously against a roller and a conveying surface on a conveying belt which is moving in a travel path to strip foreign matter therefrom, the cleaning blade comprising:
  a body having a mounting portion which is attachable to a support, a first portion projecting in a first direction away from the mounting portion, and a second portion projecting away from the mounting portion generally oppositely to the first direction,
  the first portion defining a first free end to engage a roller,
  the second portion defining a second free end to engage the conveying surface on a conveying belt,
  wherein the cleaning blade has a thickness that diminishes from the mounting portion toward the first free end of the cleaning blade,
  wherein the cleaning blade has a thickness that diminishes from the mounting portion toward the second free end of the cleaning blade.

32. The cleaning blade according to claim 29 wherein the cleaning blade has a concave surface.

33. The cleaning blade according to claim 28 wherein the cleaning blade comprises a urethane material.

34. The cleaning blade according to claim 1 wherein the one elongate opening extends over substantially the entire axial extent of the one wall.

35. A conveyor system comprising:
  a conveying belt trained around guide rollers for movement in a travel path;
  a first roller which is mounted in an operative position on a support to bear against the conveying belt; and
  a roller support system comprising at least one wall which confines downward movement of the first roller in the event that the first roller becomes disengaged from the operative position,
  the roller support system defining at least one opening through which foreign matter separated from the first roller can pass,
  the roller support system comprising first and second independent blades that define the at least one wall.

* * * * *